United States Patent [19]

Abels

[11] Patent Number: 5,096,051
[45] Date of Patent: Mar. 17, 1992

[54] ROLLER WITH CONICAL SHANK

[75] Inventor: Hubert Abels, Pommeroeul, Belgium

[73] Assignee: Vesuvius Crucible Company, Pittsburgh, Pa.

[21] Appl. No.: 555,237

[22] Filed: Jul. 19, 1990

[30] Foreign Application Priority Data

Aug. 3, 1989 [FR] France .................. 89 10587

[51] Int. Cl.⁵ .............................................. B65G 13/02
[52] U.S. Cl. ................................ 198/780; 198/781
[58] Field of Search .............. 198/780, 781, 789; 432/246; 29/123; 65/349, 273

[56] References Cited

U.S. PATENT DOCUMENTS

| | | | |
|---|---|---|---|
| 2,788,957 | 4/1957 | Lindquist | 198/789 X |
| 2,949,852 | 8/1960 | Schaefer | 29/123 X |
| 3,867,748 | 2/1975 | Miller | 29/115 |
| 3,994,380 | 11/1976 | Hope et al. | 198/780 X |
| 4,134,669 | 1/1979 | Reitner | 29/123 X |
| 4,399,598 | 8/1983 | Page et al. | 29/115 |
| 4,448,302 | 5/1984 | Weaver et al. | 198/780 X |

FOREIGN PATENT DOCUMENTS 2409472 6/1979 France .

*Primary Examiner*—Joseph E. Valenza
*Assistant Examiner*—Keith L. Dixon
*Attorney, Agent, or Firm*—Webb Burden Ziesenheim & Webb

[57] ABSTRACT

A roller includes a cylinder and at least one ferrule mounted at one end of the cylinder. The cylinder and the ferrule are designed to take up a diametrical play, such as by a conical joint that can include a tie rod or axle. A coil or the like can be provided for holding the cylinder against the bottom of the cone.

14 Claims, 2 Drawing Sheets

ROLLER WITH CONICAL SHANK

BACKGROUND OF THE INVENTION

1. Field Of The Invention

This invention relates to rollers mounted rotationally on bearings by means of ferrules, such as rollers designed to support a load that moves on a series of identical rollers mounted side by side. This load can include a strip material, such as a sheet of steel or a plate of glass.

2. Description Of The Prior Art

Rollers designed to support a metal strip are known, particularly in a heat treatment furnace in which the strip is annealed at a relatively high temperature. Such rollers are typically formed of a cylinder of refractory material and a ferrule rotationally mounted on a bearing is fixed at each end of the cylinder.

U.S. Pat. No. 4,399,598 discloses a ceramic roller for transporting glass sheets in a heat treatment furnace. The cylinder is mounted rotationally on bearings by means of ferrules mounted with play at each end of the cylinder. One or more split, circumferentially expandable, radially compressible metal rings are located in the space between the outside diameter of the cylinder and the inside diameter of the ferrule where the ferrule overlaps the cylinder.

Another known roller includes a cylinder of refractory material having metal ferrules affixed at each end. Play is provided between the ferrules and the cylinder and longitudinal metal platelets are embedded in this area of play.

These known systems of the prior art make it possible for the roller to take up differential dilatation during a temperature change. In effect, the cylinder of refractory material expands very little or not at all, while the metal ferrules expand greatly. As a result, the play between the cylinder and the ferrules varies substantially as a function of the temperature. It becomes necessary to provide elastic devices for taking up the variation in the play between the cylinder and the ferrules.

Nevertheless, these known arrangements have the disadvantage of not assuring that the ferrule and the cylinder remain coaxial under load. In effect, when the cylinder is supporting a load, the elastic devices, whether the split rings of U.S. Patent No. 4,399,598 or the longitudinal metal platelets, are deformed so that the ferrules are displaced angularly with respect to the axis of the cylinder.

It is an object of the present invention to provide a roller, including a cylinder and at least one ferrule mounted at the end of the cylinder, which overcomes this disadvantage of the prior art and will take up diametrical play while the cylinder and ferrules remain in coaxial alignment.

SUMMARY OF THE INVENTION

Accordingly, I have developed a roller which includes a cylinder and at least one ferrule mounted at one end of the cylinder. The cylinder and the ferrule have a configuration capable of taking a diametrical play. In a preferred embodiment, a ferrule is provided at each end of the cylinder and the connection between the cylinder and the ferrules is conical in configuration.

It is preferred that the roller include a means for holding the cylinder against the bottom of the conical connection with the ferrules. In a first embodiment, a tie rod is anchored at one end of the cylinder and is subject to the force of elastic means at the other end. The elastic means can be a helical coil, spring or Belleville type of washers. In a second embodiment, an axle passes axially through the cylinder and the ferrules, with the axle rigidly mounted to a first of the ferrules and with a second of the ferrules subject to the force of elastic means. In this second embodiment, a collar can be rigidly mounted to the axle beyond the second ferrule and include an elastic means extending between the collar and the second ferrule. The elastic means is preferably a helical coil surrounding the axle.

DETAILED DESCRIPTION OF THE PREFERRED EMBODIMENTS

Figure 1:
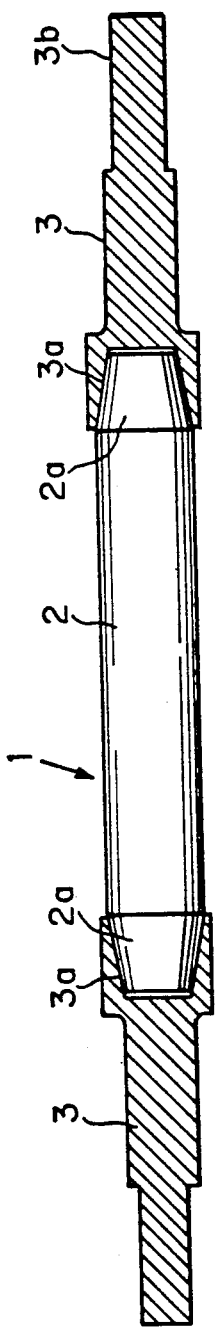
FIG. 1 is a side view, partially in section, showing the general arrangement of a roller in accordance with the present invention.

The general arrangement of a roller in accordance with the present invention, designated by reference number 1, is shown in FIG. 1. This roller includes an elongated cylinder 2 and a ferrule 3 mounted at each end of the cylinder 2. The cylinder 2 and each of the two ferrules 3 are shaped so that the joint between the cylinder 2 and each of the ferrules 3 is made without play therebetween. In the particular example shown in FIG. 1, this connection is a conical joint. The cylinder 2 terminates at each end in a male cone 2a, while each ferrule 3 has at one end thereof a female cone 3a adapted to connect tightly and without play on a male cone 2a of the cylinder 2. With an increase in the inside diameter of the ferrules 3, e.g., due to thermal expansion, the ferrules 3 will be displaced axially along the cylinder 2 and permit any developing play to be taken up. This maintains a tight connection between the cylinder 2 and the ferrules 3. The angle of conicity between the male cone 2a and female cone 3a should be the same and should be greater or equal to the angle of friction between the two materials. If the angle is too large with respect to friction, the joint can be lubricated.

Figure 2:
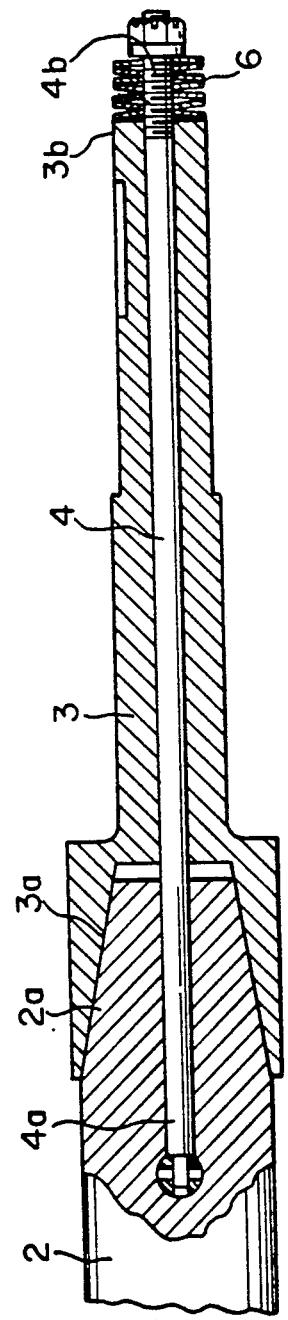
FIG. 2 is a side view, partially in section, of the end of a first embodiment of a roller in accordance with the present invention.

FIG. 2 shows a particular arrangement that makes it possible to obtain an axial displacement in one direction or the other of a ferrule 3 with respect to an end of the cylinder 2. A tie rod 4 passes through the ferrule 3 and is anchored at a first end 4a in the cylinder 2. The second end 4b of the tie rod 4 beyond a free end 3b of the ferrule 3 is subjected to the action of an elastic return means 6. The first end 4a of the tie rod 4 is anchored in the cylinder 2 by any suitable means and a particular anchoring means is shown in FIG. 4.

Figure 3:
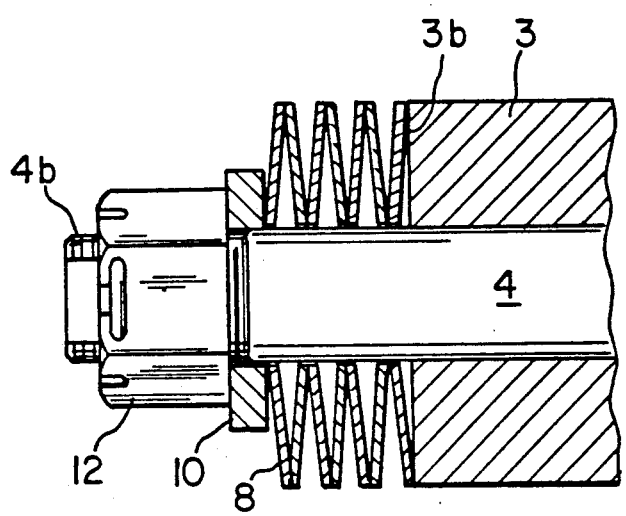
FIG. 3 is a detailed view, partially in section, showing the end of the ferrule in FIG. 2 and the elastic means of returning the tie rod.
Figure 5:
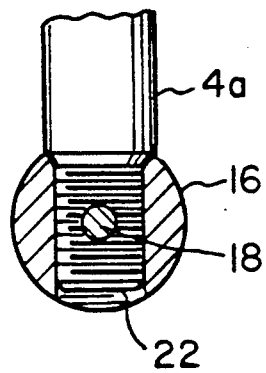
FIG. 5 is a section taken along lines V—V in FIG. 4.

FIG. 3 shows a detailed view of one example of an elastic return means 6 for the tie rod 4 shown in FIG. 2. A nut 12 or the like is fixedly attached to the second end 4b of the tie rod 4 and spaced from the free end 3b of the ferrule 3. A solid washer 10 is placed around the tie rod 4 adjacent the nut 12 and a series of Belleville washers 8 are positioned around the tie rod 4 between and in contact with the solid washer 10 and the free end 3b of the ferrule 3. The Belleville washers 8 exert a force against the free end 3b of the ferrule 3 and keep the female cone 3a of the ferrule 3 in contact with the male cone 2a on the cylinder 2, yet permit relative movement between the ferrule 3 and cylinder 2 due to thermal expansion or contraction.

Figure 4:
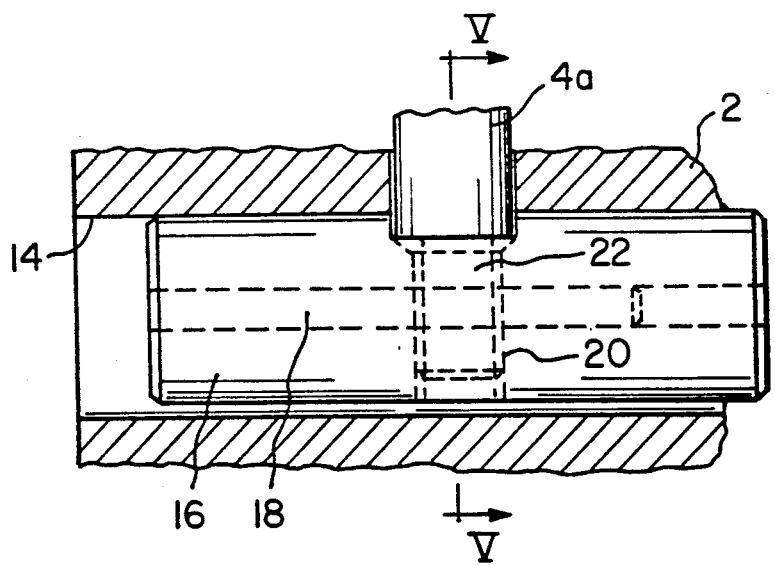
FIG. 4 is a detailed view showing a preferred means of anchoring the tie rod in the cylinder of FIG. 2.

FIG. 4 shows a detailed view of an arrangement that permits the anchoring of the free end 4a of the tie rod 4 in the cylinder 2. A first cylindrical hole 14 passes diametrically through the cylinder 2. A first solid cylindrical pin 16 is inserted through the first hole 14. The first pin 16 has a threaded bore 20 therein extending perpendicular to the first hole 14. The first end 4a of the tie rod 4 ends in a threaded portion 22 which is screwed into the threaded bore 20. The first pin 16 is pierced axially by a second pin 18 which also passes through the threaded portion 22 of the tie rod 4a. The second pin 18 is inserted to prevent any accidental unscrewing of the end 4a of the tie rod 4 from the first pin 16. With this assembly, the tie rod 4 is firmly fixed in the cylinder 2 without risk of coming apart.

Figure 6:
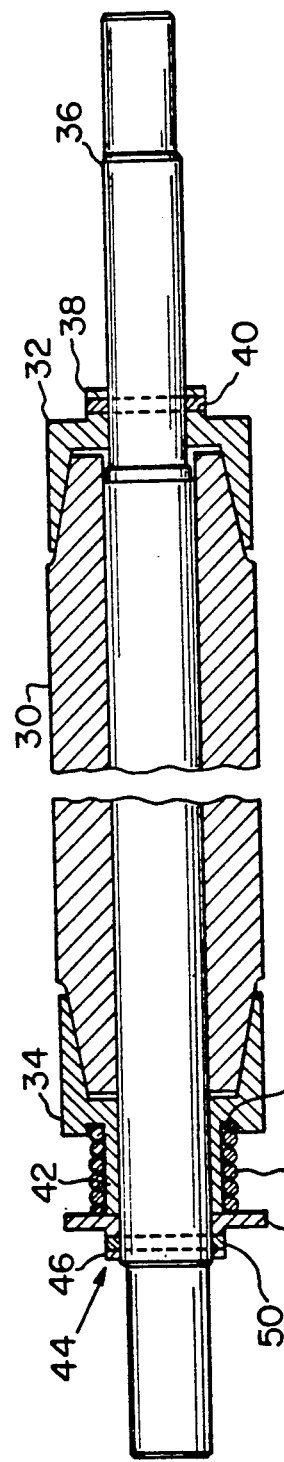
FIG. 6 is a side view, partially in section, of a second embodiment of a roller in accordance with the present invention.

A second embodiment of a roller in accordance with the present invention is shown in FIG. 6. The roller includes a cylinder 30 and a first ferrule 32 and second ferrule 34 at opposite ends of the cylinder 30 and connected thereto by the same conical arrangement described above in FIGS. 1 and 2. The cylinder 30 and ferrules 32, 34 are hollow and include a steel axle 36 passing axially therethrough and beyond the ferrules 32, 34. The first ferrule 32 has a sleeve 38 extending outward along the axle 36. A pin 40 extends through sleeve 38 and into the axle 36 to mount the first ferrule 32 rigidly thereto. The second ferrule 32 also includes a sleeve 42 extending outward along the axle 36. A collar 44, including a narrower sleeve 46 and a wider ring 48, is positioned around the axle 36 beyond the second ferrule 34, with the ring 48 facing the second ferrule 34. A pin 50 extends through sleeve 46 and into the axle 36 to mount the collar 44 rigidly thereto. The second ferrule 34 is free to slide along the axle 36 between the cylinder 30 and the collar 44. A helical coil 52 surrounds the axle 36 and the sleeve 42 of the second ferrule 34 and extends between and in contact with the ring 48 on the collar 44 and a retaining notch 54 in the second ferrule 34. The helical coil 52 provides constant force on the second ferrule 34 to maintain the contact between the ferrules 32, 34 and the cylinder 30 when the roller is expanding or contracting due to temperature changes.

Having described above the presently preferred embodiments of the present invention, it is to be understood that it may be otherwise embodied within the scope of the appended claims.

I claim:

1. A roller for carrying a load under varying temperature conditions comprising an elongated cylinder terminating at least at one end in a male cone and at least one ferrule having a female cone at one end thereof and connected by said female cone to said end of said cylinder at said male cone.

2. The roller according to claim 1 wherein the cylinder is formed of a refractory material.

3. The roller according to claim 1 further including means for holding the cylinder against the bottom of the conical connection with the ferrule.

4. The roller according to claim 3 wherein the means for holding the cylinder against the bottom of the conical connection includes a tie rod anchored at one end in the cylinder and subject to the force of an elastic means at the other end.

5. The roller according to claim 3 further including a ferrule at each end of the cylinder, wherein the means for holding the cylinder against the bottom of the conical connection includes an axle passing axially through the cylinder and the ferrules, with the axle rigidly mounted to a first of said ferrules and with a second of said ferrules subject to the force of an elastic means.

6. The roller according to claim 5 further including a collar rigidly mounted to said axle beyond said second ferrule and with an elastic means extending between said collar and said second ferrule.

7. The roller according to claim 6 wherein said elastic means is a helical coil surrounding said axle.

8. A roller for carrying a load under varying temperature conditions comprising an elongated cylinder terminating at each end in a male cone and a pair of ferrules each having a female cone at one end thereof and connected by said female cone to each end of said cylinder at said male cones.

9. The roller of claim 8 wherein the cylinder is formed of a refractory material.

10. The roller of claim 8 further including means for holding the cylinder against the bottom of the conical connection with the ferrule while the temperature of the roller varies.

11. The roller of claim 10 wherein the means for holding the cylinder against the bottom of the conical connection includes a tie rod anchored at one end in the cylinder and subject to the force of an elastic means at the other end.

12. The roller of claim 10 wherein the means for holding the cylinder against the bottom of the conical connection includes an axle passing axially through the cylinder and the ferrules, with the axle rigidly mounted to a first of said ferrules and with a second of said ferrules subject to the force of an elastic means at the other end.

13. The roller of claim 12 further including a collar rigidly mounted to said axle beyond said second ferrule and with an elastic means extending between said collar and said second ferrule.

14. The roller of claim 13 wherein said elastic means is a helical coil surrounding said axle.

* * * * *

UNITED STATES PATENT AND TRADEMARK OFFICE
CERTIFICATE OF CORRECTION

PATENT NO. : 5,096,051
DATED : March 17, 1992
INVENTOR(S) : Hubert Abels It is certified that error appears in the above-identified patent and that said Letters Patent is hereby corrected as shown below:

Column 12, Lines 52-53 Column 4 "of an elastic means at the other end." should read --of elastic means.--

Signed and Sealed this

Fifth Day of October, 1993

*Attest:*

BRUCE LEHMAN

*Attesting Officer*   Commissioner of Patents and Trademarks